US009567754B2

(12) United States Patent
Desing et al.

(10) Patent No.: US 9,567,754 B2
(45) Date of Patent: Feb. 14, 2017

(54) FLOORING ASSEMBLY WITH HEAT DISSIPATION LAYER

(71) Applicant: Milwaukee Composites, Inc., Cudahy, WI (US)

(72) Inventors: James E. Desing, Elkhorn, WI (US); Andrew J. Biddle, Cedar Grove, WI (US)

(73) Assignee: Milwaukee Composites, Inc., Cudahy, WI (US)

( * ) Notice: Subject to any disclaimer, the term of this patent is extended or adjusted under 35 U.S.C. 154(b) by 18 days.

(21) Appl. No.: 14/422,779

(22) PCT Filed: Aug. 19, 2013

(86) PCT No.: PCT/US2013/055556
§ 371 (c)(1),
(2) Date: Feb. 20, 2015

(87) PCT Pub. No.: WO2014/031528
PCT Pub. Date: Feb. 27, 2014

(65) Prior Publication Data
US 2015/0233126 A1 Aug. 20, 2015

Related U.S. Application Data

(60) Provisional application No. 61/691,494, filed on Aug. 21, 2012.

(51) Int. Cl.
*B32B 5/06* (2006.01)
*E04F 15/02* (2006.01)
*B32B 37/18* (2006.01)

(52) U.S. Cl.
CPC ....... *E04F 15/02177* (2013.01); *B32B 37/182* (2013.01); *B32B 2305/08* (2013.01);
(Continued)

(58) Field of Classification Search
CPC ............ E04F 15/02177; B32B 2305/38; B32B 2307/302; H05B 3/286
(Continued)

(56) References Cited

U.S. PATENT DOCUMENTS 2,512,875 A 6/1950 Reynolds
2,601,284 A 6/1952 Hemming et al.
(Continued)

FOREIGN PATENT DOCUMENTS

EP 0241116 A1 10/1987
EP 1046576 A2 10/2000
JP 04206380 * 7/1992

OTHER PUBLICATIONS

International Preliminary Report on Patentability and Written Opinion for Application No. PCT/US2013/055556 dated Mar. 5, 2015 (8 pages).

*Primary Examiner* — Alexander Thomas
(74) *Attorney, Agent, or Firm* — Michael Best & Friedrich LLP

(57) ABSTRACT

A flooring assembly (100) for a compartment floor includes a panel (104) made up of a first skin (126), a second skin (128) positioned below the first skin, and a core (120) encapsulated within the panel between the first and second skins and peripheral closeouts (124). A heat dissipation layer (116) is provided in the flooring assembly at or above the first skin.

14 Claims, 4 Drawing Sheets

(52) U.S. Cl.
CPC ..... *B32B 2305/38* (2013.01); *B32B 2307/302* (2013.01); *B32B 2361/00* (2013.01); *B32B 2471/00* (2013.01); *Y10T 428/239* (2015.01)

(58) Field of Classification Search
USPC .......................................................... 428/76
See application file for complete search history.

(56) References Cited

U.S. PATENT DOCUMENTS

| | | | |
|---|---|---|---|
| 3,697,728 | A | 10/1972 | Stirzenbecher |
| 4,255,482 | A | 3/1981 | Udagawa |
| 4,291,079 | A | 9/1981 | Hom |
| 4,374,312 | A | 2/1983 | Damron |
| 4,606,959 | A | 8/1986 | Hillinger |
| 5,851,336 | A | 12/1998 | Cundiff et al. |
| 6,834,159 | B1 | 12/2004 | Schramm |
| 7,897,235 | B1 * | 3/2011 | Locher .................... B60R 13/08 428/71 |
| 2002/0100404 | A1 | 8/2002 | Gottfried |

* cited by examiner

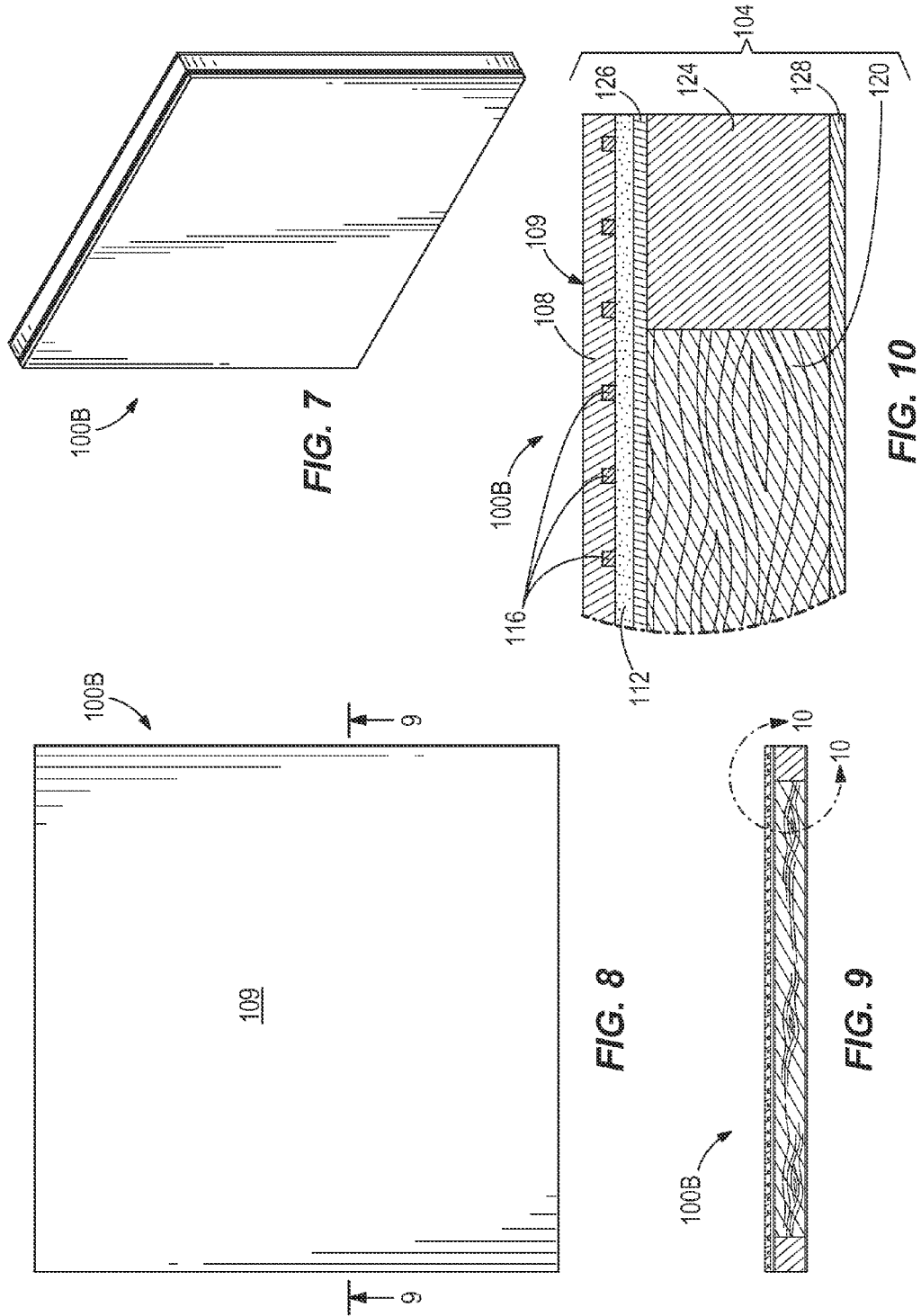

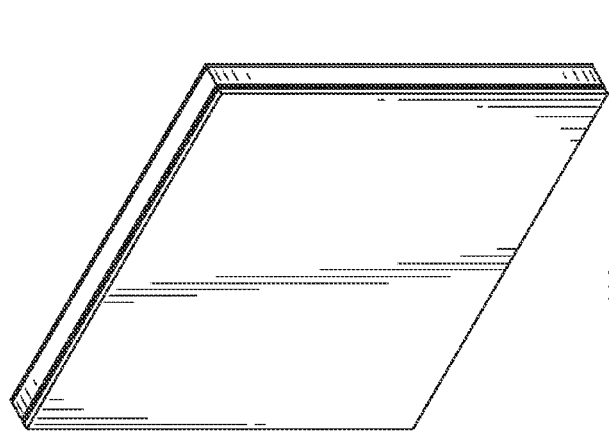
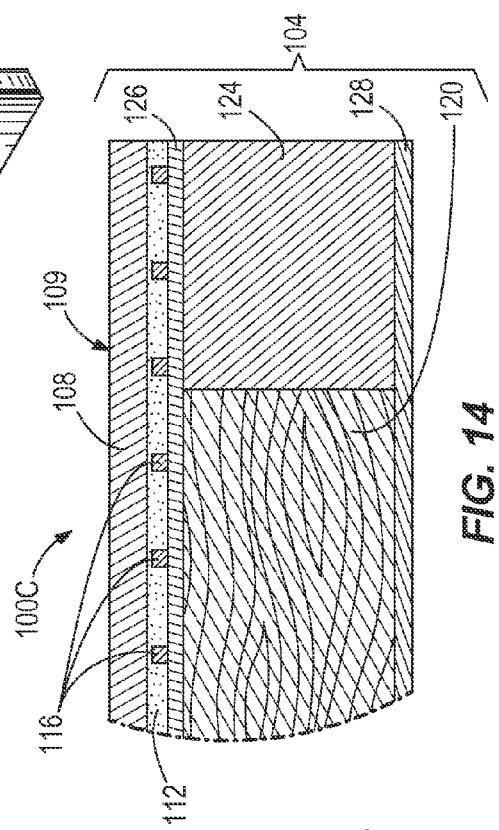
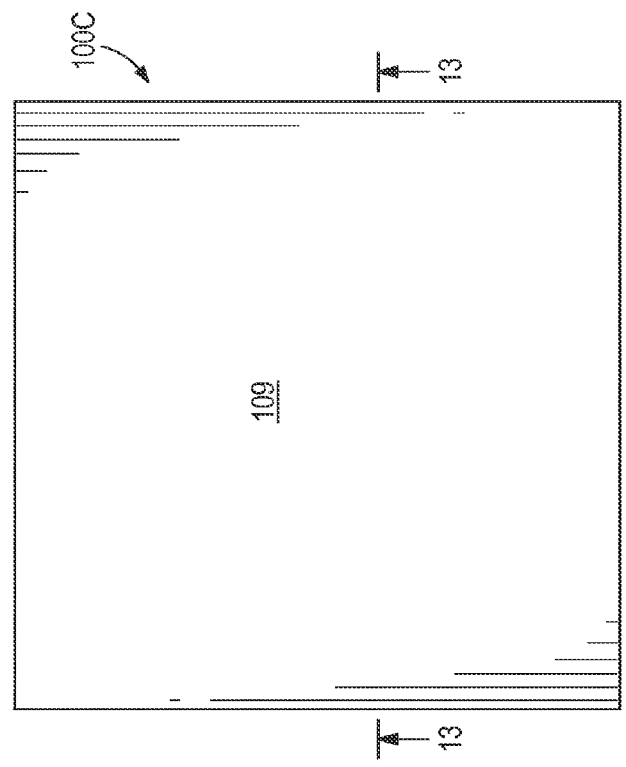
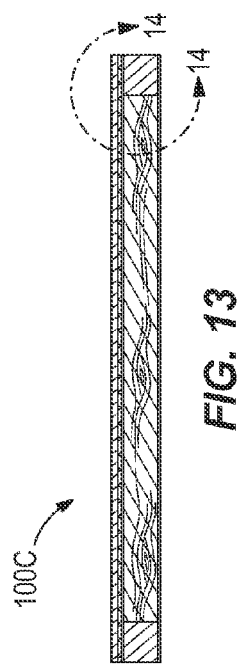

FLOORING ASSEMBLY WITH HEAT DISSIPATION LAYER

CROSS-REFERENCE TO RELATED APPLICATIONS

This application claims priority to U.S. Provisional Patent Application No. 61/691,494, filed Aug. 21, 2012, the entire contents of which are incorporated by reference herein.

BACKGROUND

The present invention relates to flooring assemblies, which can be used for example in mass transit vehicles, as well as other conveyances where light weight, strength, and fire and smoke resistance are needed. Composite panels with excellent strength-to-weight and flame and smoke resistance are known. However, these composite panels are generally highly insulative with respect to heat, without means for dissipating intense heat from a source within the passenger compartment.

SUMMARY

In one aspect, the invention provides a flooring assembly for a compartment, and the flooring assembly includes a panel made up of a first skin, a second skin positioned below the first skin, and a core encapsulated within the panel between the first and second skins and peripheral closeouts. A heat dissipation layer is provided in the flooring assembly at or above the first skin.

In one aspect, the heat dissipation layer is provided within the first skin.

In one aspect, the heat dissipation layer is provided within the mat.

In one aspect, the heat dissipation layer is provided between the mat and the first skin.

In one aspect, the heat dissipation layer is a metal mesh or screen.

In one aspect, the invention provides a flooring assembly for a compartment, and the flooring assembly includes a panel made up of a first skin, a second skin positioned below the first skin, and a core encapsulated within the panel between the first and second skins and peripheral closeouts. A mat of the flooring assembly has a first side defining a flooring surface of the compartment, and a second side of the mat opposite the first side is bonded to the first skin of the panel, defining an interface therebetween. A heat dissipation layer is provided in the flooring assembly adjacent the interface.

In one aspect, the invention provides a method of manufacturing a layered composite floor panel. A first layer of uncured resin, a core having a density lower than the first layer of uncured resin, and a second layer of uncured resin are stacked together. A metal mesh heat dissipation layer is embedded within the first layer of uncured resin. The first and second resin layers are cured into first and second skins.

Other aspects of the invention will become apparent by consideration of the detailed description and accompanying drawings.

BRIEF DESCRIPTION OF THE DRAWINGS

FIG. 7 is a perspective view of a flooring assembly of a second configuration, utilizing the components of FIGS. 1-2.

FIG. 8 is a plan view of the flooring assembly of FIG. 7.

FIG. 9 is a cross section of the flooring assembly, taken along line 9-9 of FIG. 8, illustrating the heat dissipation layer embedded into a mat of the flooring assembly.

FIG. 10 is a detail view of the cross-section of FIG. 9.

FIG. 11 is a perspective view of a flooring assembly of a third configuration, utilizing the components of FIGS. 1-2.

FIG. 12 is a plan view of the flooring assembly of FIG. 11.

FIG. 13 is a cross section of the flooring assembly, taken along line 13-13 of FIG. 12 and illustrating the heat dissipation layer embedded into an adhesive layer of the flooring assembly which bonds the panel and the mat.

FIG. 14 is a detail view of the cross-section of FIG. 13.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
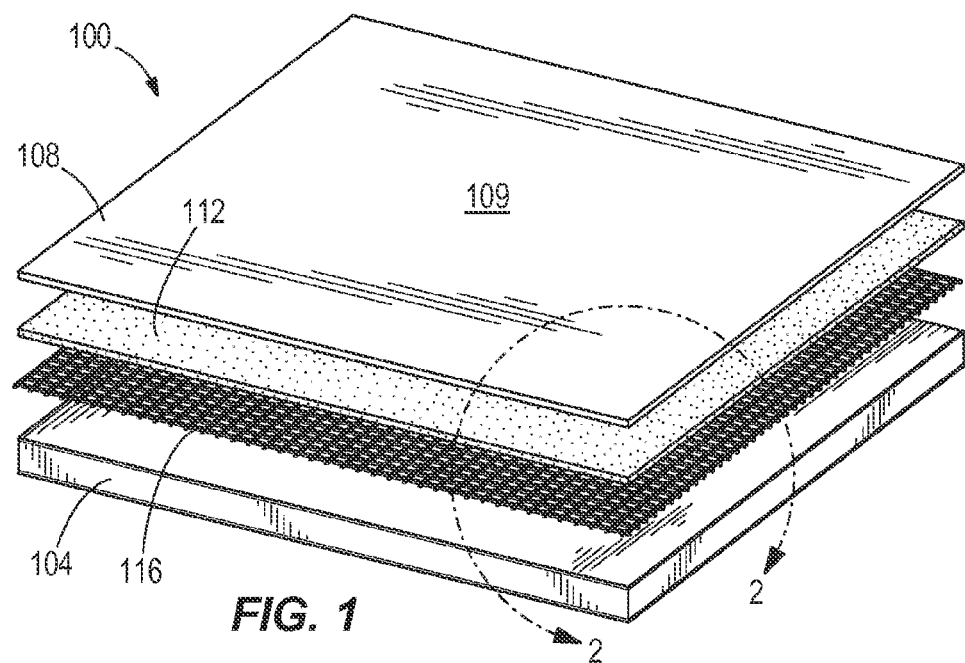
FIG. 1 is an exploded perspective view illustrating components of a flooring assembly including a heat dissipation layer.
Figure 2:
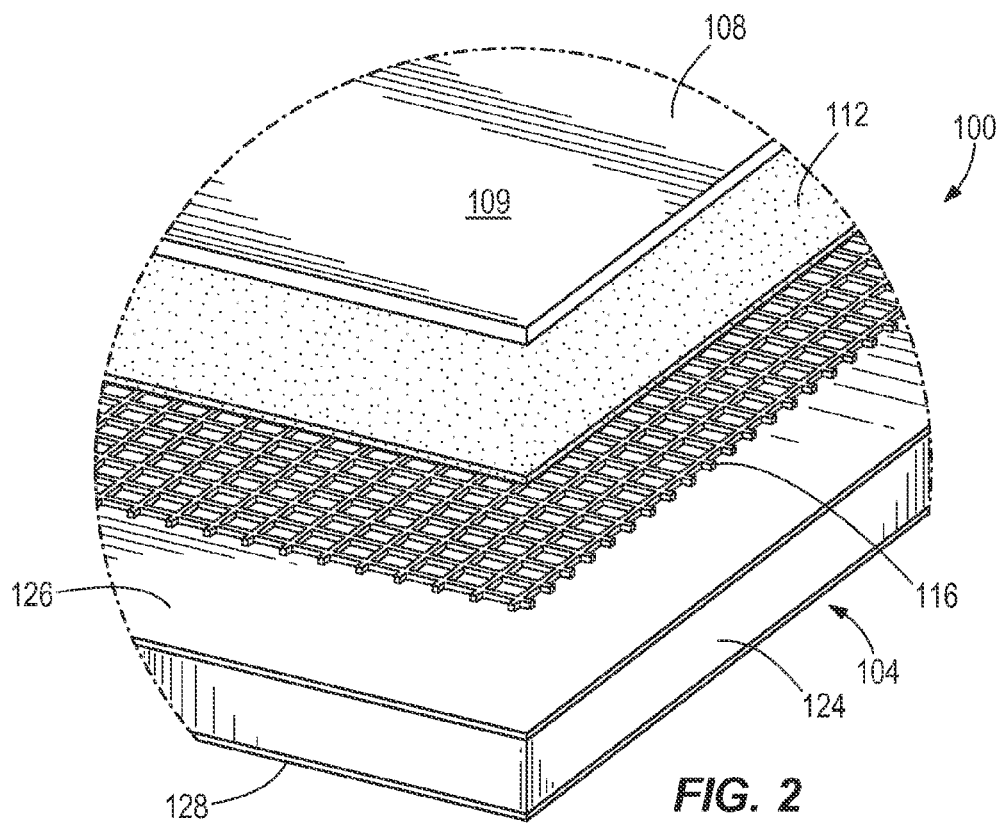
FIG. 2 is a detail perspective view better illustrating the components of FIG. 1.
Figure 3:
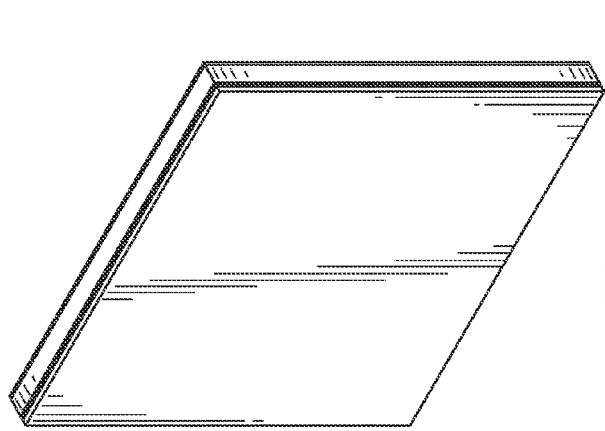
FIG. 3 is a perspective view of a flooring assembly of a first configuration, utilizing the components of FIGS. 1-2.
Figure 6:
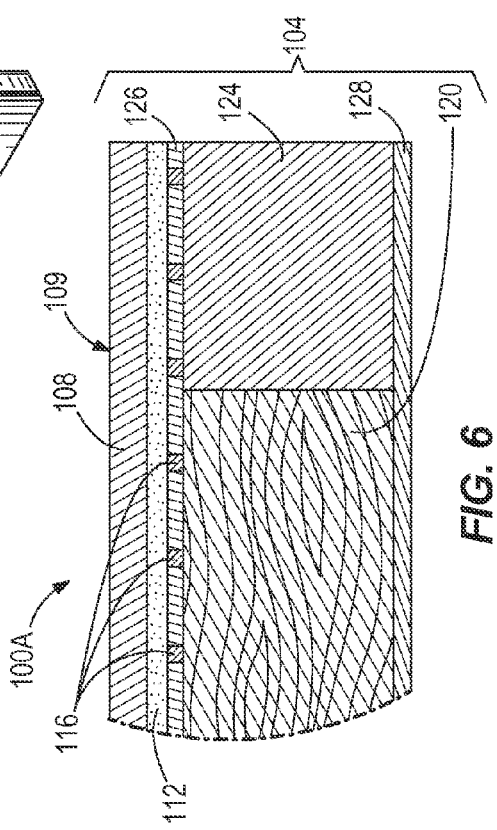
FIG. 6 is a detail view of the cross-section of FIG. 5.
Figure 4:
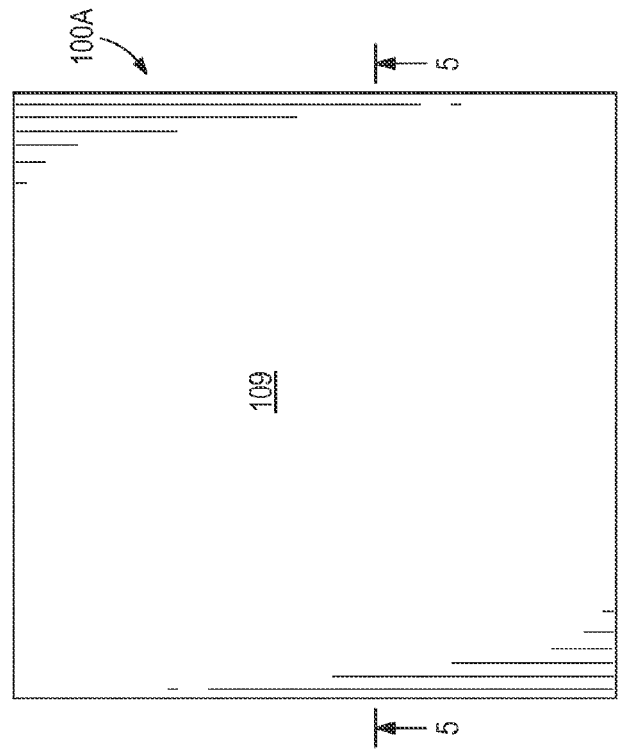
FIG. 4 is a plan view of the flooring assembly of FIG. 3.
Figure 5:
FIG. 5 is a cross section of the flooring assembly, taken along line 5-5 of FIG. 4, illustrating the heat dissipation layer embedded into a panel skin of the flooring assembly.

FIGS. 1 and 2 illustrate a flooring assembly 100 including a panel 104 and a mat 108. The mat 108 can be constructed of a resilient material such as rubber and provides a flooring surface 109 which can be an exposed traffic surface of a compartment (e.g., the flooring surface of a train car, bus, elevator, etc.). A surface of the mat 108 opposite the flooring surface 109 is bonded to the panel 104 by an adhesive layer 112. A heat dissipation layer 116 is provided on a first (interior) side of the panel 104 as described in further detail below.

Although not necessarily limited to such, the panel 104 can be constructed according to any one of the embodiments of U.S. Pat. Nos. 6,824,851, 7,897,235, or U.S. Patent Application Publication No. 2011/0147358, the entire contents of all of which are hereby incorporated by reference. Generally, the panel 104 is a lightweight composite panel utilizing resin skins and a lower density core 120 encapsulated within the resin. The low-density core 120 has opposing first and second surfaces ("upper" and "lower" surfaces) and a perimeter. The opposing upper and lower surfaces of the core 120 are bounded by first and second resin skins 126, 128, and the perimeter of the core 120 is also surrounded by resin, for example, by a plurality of closeouts 124 (e.g., pre-cured closeout blocks). The closeouts 124 can also take other constructions that utilize or cooperate with the skins 126, 128 to encapsulate the core 120. The skins 126, 128 can be fiber-reinforced (e.g., via a fabric sheet such as fiberglass) and can be integrated with the panel 104 and coupled through the core 120 by fiber-reinforced phenolic ribs (not shown) extending perpendicular to the first and second skins 126, 128 through the core 120 at a plurality of spaced-apart locations. The remainder of the core 120 can be foam, balsa wood or another suitable low-density material. The first or upper skin 126 faces toward an interior space of a compartment into which the flooring assembly 100 is provided. The second or lower skin 128 faces toward an exterior of the compartment. The compartment can include any number of panels 104, provided in any desired size, thickness, and shape. As described below, the heat dissipation element 116 can be integrated into the flooring assembly 100 in a variety of ways.

In a first optional construction illustrated in FIGS. 3-6, the flooring assembly 100A includes a heat dissipating element 116 embedded into the panel 104. More particularly, the heat dissipating element 116 is embedded into the first or upper skin 126. For example, the heat dissipating element 116 can be laid into uncured phenolic resin, which is cured (e.g., via heat and/or pressure) to form the first skin 126. Once cured, the heat dissipating element 116 is substantially or entirely embedded within the first skin 126. The mat 108 is bonded to the exterior surface of the first skin 126 with the adhesive layer 112 such that the surface 109 of the mat 108 provides a flooring surface for a compartment. Because the heat dissipating element 116 is adjacent the mat 108 and not separated therefrom by the core 120, which has good heat insulation properties, intense heat exposed to the mat 108 from inside the compartment is dissipated or distributed by the heat dissipating element 116 which has very good heat conduction. In some constructions, the heat dissipating element 116 is a mesh or screen of metallic material such as copper or aluminum. The metal mesh can have strands of about 0.030 inch to about 0.060 inch and can have a strand count of 2 strands per inch to about 8 strands per inch. For example, in one construction, the heat dissipating element 116 embedded into the first skin 126 can be a copper mesh with strands of about 0.047 inch and a strand count of about 4 strands per inch, which yields an areal density of about 0.65 pounds per square foot or 3.17 kg per square meter. In other constructions, the heat dissipating element 116 can have thinner strands of about 0.010 inch to about 0.020 inch and can have a higher strand count of 18 strands per inch to about 26 strands per inch. For example, the heat dissipating element 116 can be a mesh with strands of about 0.015 inch and a strand count of about 22 strands per inch, which yields an areal density less than about 0.40 pounds per square foot or 2.0 kg per square meter for copper.

The heat dissipating element 116 can have a thickness about the same as or less than the thickness of the first skin 126. If the thickness of the heat dissipating element 116 is less than the thickness of the first skin 126, the heat dissipating element 116 can be placed at a desired depth within the first skin 126. For example, the heat dissipating element 116 can be positioned adjacent the core 120 or if not adjacent the core 120, beneath at least one layer of fiberglass embedded into the resin. In such a construction, the heat dissipating element 116 may be configured to add structural rigidity to the panel 104. In other constructions, the heat dissipating element 116 may be positioned adjacent the exterior surface of the first skin 126 (e.g., laid into a final "veil" resin layer of the first skin 126) to be as close as possible to the mat 108 while still being embedded within the first skin 126.

In a second optional construction illustrated in FIGS. 7-10, the flooring assembly 100B includes a heat dissipating element 116 embedded into the mat 108. For example, the heat dissipating element 116 can be laid into uncured rubber, which is then subjected to a sulfur vulcanization process to form the mat 10$. Once cured, the heat dissipating element 116 is substantially or entirely embedded within the mat 108. The mat 108 is bonded to the exterior surface of the first skin 126 with the adhesive layer such that the surface 109 of the mat 108 provides a flooring surface for a compartment. Because the heat dissipating element 116 is embedded within the mat 10$ which can be directly exposed to the compartment interior, intense heat exposed to the mat 108 from inside the compartment is dissipated or distributed by the heat dissipating element 116 which has very good heat conduction. In some constructions, the heat dissipating element 116 is a mesh or screen of metallic material such as copper or aluminum. The metal mesh can have strands of about 0.030 inch to about 0.060 inch and can have a strand count of 2 strands per inch to about 8 strands per inch. For example, in one construction, the heat dissipating element 116 embedded into the mat 108 can be an aluminum mesh with strands of about 0.035 inch and a strand count of about 6 strands per inch, which yields an areal density of about 0.165 pounds per square foot or 0.8 kg per square meter. In other constructions, the heat dissipating element 116 can have thinner strands of about 0.010 inch to about 0.020 inch and can have a tighter strand count of 18 strands per inch to about 26 strands per inch. For example, the heat dissipating element 116 can be a mesh with strands of about 0.016 inch and a strand count of about 20 strands per inch, which yields an areal density of about 0.118 pour per square foot or 0.574 kg per square meter for aluminum.

The heat dissipating element 116 can have a thickness about the same as or less than the thickness of the mat 108. If the thickness of the heat dissipating element 116 is less than the thickness of the mat 108, the heat dissipating element 116 can be placed at a desired depth within the mat 108. In some constructions, the heat dissipating element 116 can be positioned substantially centrally within the thickness of the mat 108. When the heat dissipating element 116 is incorporated into the mat 10$, intense and undesirable heat applied to the flooring surface 109 can be efficiently distributed and dissipated away from the source without first being transferred through the adhesive 112 to the panel 104.

In either of the first two optional constructions 100A, 100B, the heat dissipating layer 116 is provided as a subassembly with either the panel 104 or the mat 108 and is not required to be inserted or assembled at the point of joining the mat 108 to the panel 104, Which may often occur at final assembly during construction of the compartment or structure.

In a third optional construction illustrated in FIGS. 11-14, the flooring assembly 100C includes a heat dissipating element 116 provided between the panel 104 and the mat 108. For example, the heat dissipating element 116 can be embedded into the adhesive 112. Because the heat dissipating element 116 is directly adjacent the mat 108, intense heat exposed to the mat 108 from inside the compartment is dissipated or distributed by the heat dissipating element 116 which has very good heat conduction. In some constructions, the heat dissipating element 116 is a mesh or screen of metallic material such as copper or aluminum. The metal mesh can have a strand diameter and strand count of any of the above-noted ranges, including the specific examples, among others.

In the third optional construction 100C, the heat dissipating layer 116 is provided as a separate component from the panel 104 the mat 108 and may be inserted or assembled at the point of joining the mat 108 to the panel 104, requiring no alteration to established manufacturing process for the panel 104 or the mat 108.

What is claimed is:

1. A flooring assembly for a compartment, the flooring assembly comprising:

a panel made up of a first skin defining an upper side of the panel, a second skin positioned below the first skin, and a core encapsulated within the panel between the first and second skins and peripheral closeouts, wherein the first skin includes a fiber reinforcing layer; and a heat dissipation layer entirely embedded in the first skin of the panel, wherein the heat dissipation layer is positioned above the fiber reinforcing layer.

2. The flooring assembly of claim 1, wherein the heat dissipation layer is positioned directly adjacent an exterior surface of the first skin.

3. The flooring assembly of claim 1, wherein the first skin is constructed of phenolic resin in which both the fiber reinforcing layer and the heat dissipation layer are embedded.

4. The flooring assembly of claim 1, further comprising a mat positioned above the first skin.

5. The flooring assembly of claim 4, further comprising an adhesive layer bonding the first skin and the mat.

6. The flooring assembly of claim 1, wherein the heat dissipation layer is a metal mesh.

7. The flooring assembly of claim 6, wherein the heat dissipation layer is constructed of copper.

8. A flooring assembly for a compartment, the flooring assembly comprising:

a panel made up of a first skin, a second skin, and a core encapsulated within the panel between the first and second skins and peripheral closeouts;

a mat having a first side that is exposed, wherein a second side of the mat opposite the first side is bonded to the first skin of the panel, defining an interface therebetween; and a heat dissipation layer entirely embedded in the first skin, the heat dissipation layer positioned directly adjacent an exterior surface of the first skin adjacent the interface.

9. The flooring assembly of claim 8, wherein the first skin includes a fiber reinforcing layer, and the heat dissipation layer is positioned above the fiber reinforcing layer.

10. The flooring assembly of claim 9, wherein the first skin is constructed of phenolic resin in which both the fiber reinforcing layer and the heat dissipation layer are embedded.

11. The flooring assembly of claim 8, wherein the heat dissipation layer has a thickness approximately equal to a thickness of the first skin.

12. The flooring assembly of claim 8, further comprising an adhesive layer between the second side of the mat and the first skin.

13. The flooring assembly of claim 8, wherein the heat dissipation layer is a metal mesh.

14. The flooring assembly of claim 13, wherein the heat dissipation layer is constructed of copper.

* * * * *